(12) United States Patent
Pope et al.

(10) Patent No.: US 7,543,831 B2
(45) Date of Patent: Jun. 9, 2009

(54) APPARATUS FOR INSTALLING A SENSOR ON A KINGPIN

(75) Inventors: Randolph J. Pope, Racine, WI (US); Edmund R. Henkel, Naperville, IL (US)

(73) Assignee: CNH America LLC, New Holland, PA (US)

( * ) Notice: Subject to any disclaimer, the term of this patent is extended or adjusted under 35 U.S.C. 154(b) by 582 days.

(21) Appl. No.: 11/264,524

(22) Filed: Nov. 1, 2005

(65) Prior Publication Data
US 2006/0055138 A1 Mar. 16, 2006

Related U.S. Application Data

(63) Continuation-in-part of application No. 10/931,702, filed on Sep. 1, 2004, now Pat. No. 7,296,810.

(60) Provisional application No. 60/623,241, filed on Nov. 1, 2004.

(51) Int. Cl.
*B62D 7/18* (2006.01)
(52) U.S. Cl. .................. 280/93.5; 280/93.512
(58) Field of Classification Search ............ 280/93.512, 280/93.5
See application file for complete search history.

(56) References Cited

U.S. PATENT DOCUMENTS

| | | | | |
|---|---|---|---|---|
| 2,512,881 A * | 6/1950 | Smiley, Jr. .................. 384/396 |
| 3,438,646 A | 4/1969 | Hannapel |
| 4,775,026 A | 10/1988 | Sollbach et al. ............. 180/249 |
| 4,866,981 A | 9/1989 | Matsumoto et al. ......... 73/118.1 |
| 4,903,525 A | 2/1990 | Chiba et al. ................... 73/116 |
| 5,366,042 A | 11/1994 | Wilks et al. ................. 180/253 |
| 5,408,894 A | 4/1995 | Henson ...................... 73/866.5 |
| 5,636,703 A | 6/1997 | Papke et al. ................. 180/400 |
| 5,647,396 A | 7/1997 | Stommes et al. ............ 137/554 |
| 5,661,890 A | 9/1997 | Pfaffenberger ............. 29/426.6 |
| 6,261,182 B1 | 7/2001 | Chino et al. .................. 464/89 |
| 6,293,022 B1 | 9/2001 | Chino et al. ............. 33/203.18 |
| 6,417,664 B1 | 7/2002 | Ventroni et al. .......... 324/207.2 |
| 6,460,429 B1 | 10/2002 | Staker ......................... 74/513 |
| 6,486,764 B2 | 11/2002 | Byram ....................... 336/110 |
| 6,494,471 B2 | 12/2002 | Lukac ....................... 280/93.5 |
| 6,502,839 B1 | 1/2003 | Chino et al. ........... 280/93.512 |
| 6,568,696 B2 | 5/2003 | Osborn et al. ............. 280/93.5 |
| 6,597,168 B1 | 7/2003 | Lee ......................... 324/207.2 |
| 6,902,176 B2 * | 6/2005 | Gottschalk ............. 280/93.512 |

(Continued)

*Primary Examiner*—Ruth Ilan
*Assistant Examiner*—Drew J. Brown
(74) *Attorney, Agent, or Firm*—Patrick M. Sheldrake; John William Stader; Michael C. Harms

(57) ABSTRACT

Apparatus for installing a sensor on a kingpin for a steering assembly, including a mount having a passage therethrough extending between opposite end portions thereof, one of the end portions being configured for mounting on one end of a kingpin in alignment with a passage therethrough such that the passage through the mount will serve as an extension of the passage through the kingpin and such that a steering axis of a wheel hub extending through the passage through the kingpin will extend through the passage through the mount, and the other of the end portions of the mount being configured for mounting a sensor thereon such that an input of the sensor will be located in a position for sensing a rotational position of an element extending through and rotatable within the passage through the kingpin.

19 Claims, 6 Drawing Sheets

U.S. PATENT DOCUMENTS

2002/0070071 A1 6/2002 Schuh
2002/0070520 A1 6/2002 Osborn et al.
2002/0089142 A1 7/2002 Lukac

* cited by examiner

APPARATUS FOR INSTALLING A SENSOR ON A KINGPIN

This patent application is a continuation-in-part of U.S. patent application Ser. No. 10/931,702, filed Sep. 1, 2004 now U.S. Pat. No. 7,296,810, and claims priority from U.S. Provisional Patent Application Ser. No. 60/623,241, filed Nov. 1, 2004.

TECHNICAL FIELD

The present invention generally relates to apparatus for sensing angular position of steerable wheels and, more particularly, to apparatus for mounting a sensor on a kingpin of a steering assembly in connection with a steerable wheel of a vehicle, for sensing an angular position of the steerable wheel about a steering axis thereof.

BACKGROUND ART

Commonly, a sensor for sensing relative position of members require some adjustment of the sensor during installation. For instance, a sensor for sensing a rotational position or steering angle of a wheel and/or wheel hub assembly of a vehicle about a steering axis typically must be installed such that correct electrical outputs are produced when the wheel and/or hub assembly is in a center or straight ahead position and in a range of rotated or turned positions. Achieving this commonly entails a trial and error process wherein the sensor is mounted or installed, and then is adjusted, such as by applying a voltage input to the sensor and rotating it while in its mounted position and measuring voltage outputs, until an orientation is found wherein desired output or outputs are obtained. The sensor is then fixed in that orientation. Disadvantages of this process include the time and equipment required for the trial and error steps, and inconvenience due to the location of the sensor in connection with a steering system which is typically in a difficult to access location such as beneath the vehicle or in a steering assembly. If exposed, and adjustably mounted, the sensor can be jarred out of adjustment, and fasteners holding the sensor in an adjusted position can become loosened. Additionally, an extension such as a shaft or other member is commonly required to connect the sensor input to the relatively movable member to which it is to be connected, which can add another variable to the adjustment process. Reference in this regard, Lukac U.S. Pat. No. 6,494,471B1 issued Dec. 17, 2002 to New Holland North America, Inc., and Chino et al. U.S. Pat. No. 6,261,182B1 issued Jul. 17, 2001 to Kabushiki Kaisha Toyoda Jidoshokki Seisakusho of Japan.

As illustrated in U.S. Pat. No. 6,494,471, kingpins are commonly utilized in steering assemblies of vehicles such as agricultural machines including combines, cotton pickers, tractors, and the like, especially to hold a steerable wheel hub in a C-shaped support frame, or on the C-shape of a wheel hub assembly for connection to an axle or frame. Kingpins are well known, commercially available items, typically having a mounting flange around one end, and an axial passage therethrough for conveying lubricant, particularly grease, from one end of the kingpin, particularly a more readily accessible end, to an opposite end, typically less accessibly located within the steering assembly, for lubricating a bearing or bushing connecting the kingpin to another member of the steering assembly with which the kingpin is relatively rotatable for effecting steering movements of a steerable wheel in connection therewith. It would be advantageous to provide a capability to mount a sensor in connection with a steering assembly at an accessible location such as on a kingpin thereof. It would also be advantageous to provide a capability to mount a sensor on a standard, commercially available kingpin, without requiring significant or costly modifications to the kingpin. Additionally, it would be advantageous to provide a capability to mount a sensor on a kingpin without significantly reducing or negatively affecting the ability to lubricate the steering assembly.

Thus, what is sought is apparatus for installing a sensor on a kingpin of a steering assembly which provides one or more of the advantages and overcomes one or more of the disadvantages and shortcomings, set forth above.

SUMMARY OF THE INVENTION

According to the invention, apparatus for installing a sensor on a kingpin for a steering assembly, which provides one or more of the advantages and overcomes one or more of the disadvantages and shortcomings set forth above, is disclosed. According to a preferred aspect of the invention, a sensor can include a body or portion and an input. The input can be movable relative to the body, or otherwise effect a change of state or condition of the sensor, when another element is moved or rotated to rotate the input, or is rotated relative thereto, for providing a signal representative of a position of the element, preferably including a predetermined signal representative of a predetermined position of the element.

A preferred apparatus of the invention includes a mount having a passage therethrough extending between opposite end portions thereof, one of the end portions being configured, preferably by including a threaded portion, for mounting on one end of a kingpin in alignment with a passage therethrough, such that the passage through the mount will serve as an extension of the passage through the kingpin. As a result, a steering axis of a wheel hub extending through the passage through the kingpin will extend also through the passage through the mount. The other of the end portions of the mount is configured for mounting a sensor thereon such that an input of the sensor will be located in a position for sensing a rotational position of an element extending through and rotatable within the passage through the kingpin, such that the sensor will output a signal representative thereof.

The threaded portion of the one end portion of the mount is preferably a male tapered threaded portion configured for threadedly mounting in a female tapered threaded portion on one end of a standard, commercially available kingpin, in alignment with a passage therethrough. The female threads are conventionally provided for receiving a grease fitting commonly known as a ZERC, and the passage through the kingpin is provided for providing a passage for grease to reach a bearing in connection with the kingpin, in the well known manner.

The other of the end portions of the mount additionally preferably includes threaded holes at predetermined locations on opposite sides of the passage through the mount, for receiving threaded fasteners for mounting a sensor in a predetermined orientation thereon, and the mount is threadedly mountable on a kingpin at a predetermined rotational position about a passage therethrough, such that a sensor mounted on the mount will be oriented at a predetermined rotational position about a passage through a kingpin on which the mount is mounted.

As another preferred feature, the mount includes a second passage therein in connection with the passage therethrough, and an opening in connection with the second passage configured for receiving a grease fitting therein, for lubrication.

The invention preferably includes an element such as a pin configured so as to be positionable and rotatable in the passage through the mount, the pin or other element having a length which is sufficient so as to extend beyond the passage through the mount so as to be capable of extending through a passage through a kingpin on which the mount is mounted and so as to extend into a sensor mounted on the mount, the pin or other element including an end configured so as to be fixedly connectable to a member with which a kingpin is relatively rotatable. The opposite end of the pin preferably includes a coupler rotatable about the pin and fixable thereon at a selected rotational position about an axis extending therethrough, the coupler being cooperatively engageable with the input of the sensor when in a predetermined rotational position, such that the input of the sensor and a body of the sensor can be oriented in predetermined rotational positions in relation to a kingpin and the member with which a kingpin is relatively rotatable, and such that the input of the sensor and the body will be relatively rotated by relative rotational movements of the member and the kingpin.

The pin additionally preferably includes a groove therearound disposed so as to be located between the other of the end portions of the mount and the lateral passage, the groove being configured for receiving an O-ring therein for forming a sealed condition between the pin and an internal surface of the mount defining the passage therethrough, for preventing lubricant introduced into the kingpin through the second passage from reaching and fouling or otherwise interfering with the operation of the sensor.

The input of the sensor is connected in the predetermined relation to the coupler and the body is mounted in a predetermined position on the mount, such that when one or both of the kingpin and the other member are moved so as to be in different relative positions, the sensor will provide signals representative of the different relative positions, respectively, including the predetermined signal when the kingpin and the member are in a predetermined relative position such as a straight ahead position.

As a result, when the sensor is installed, it is in proper position and orientation for providing or outputting a signal representative of the predetermined relative position, which can represent a straight ahead orientation of a wheel and hub assembly, as well as predetermined signals representative of a range of relatively rotated positions of the kingpin and other member, which can, for instance, represent other steering positions of the wheel and hub assembly.

DETAILED DESCRIPTION OF THE INVENTION

Figure 1:
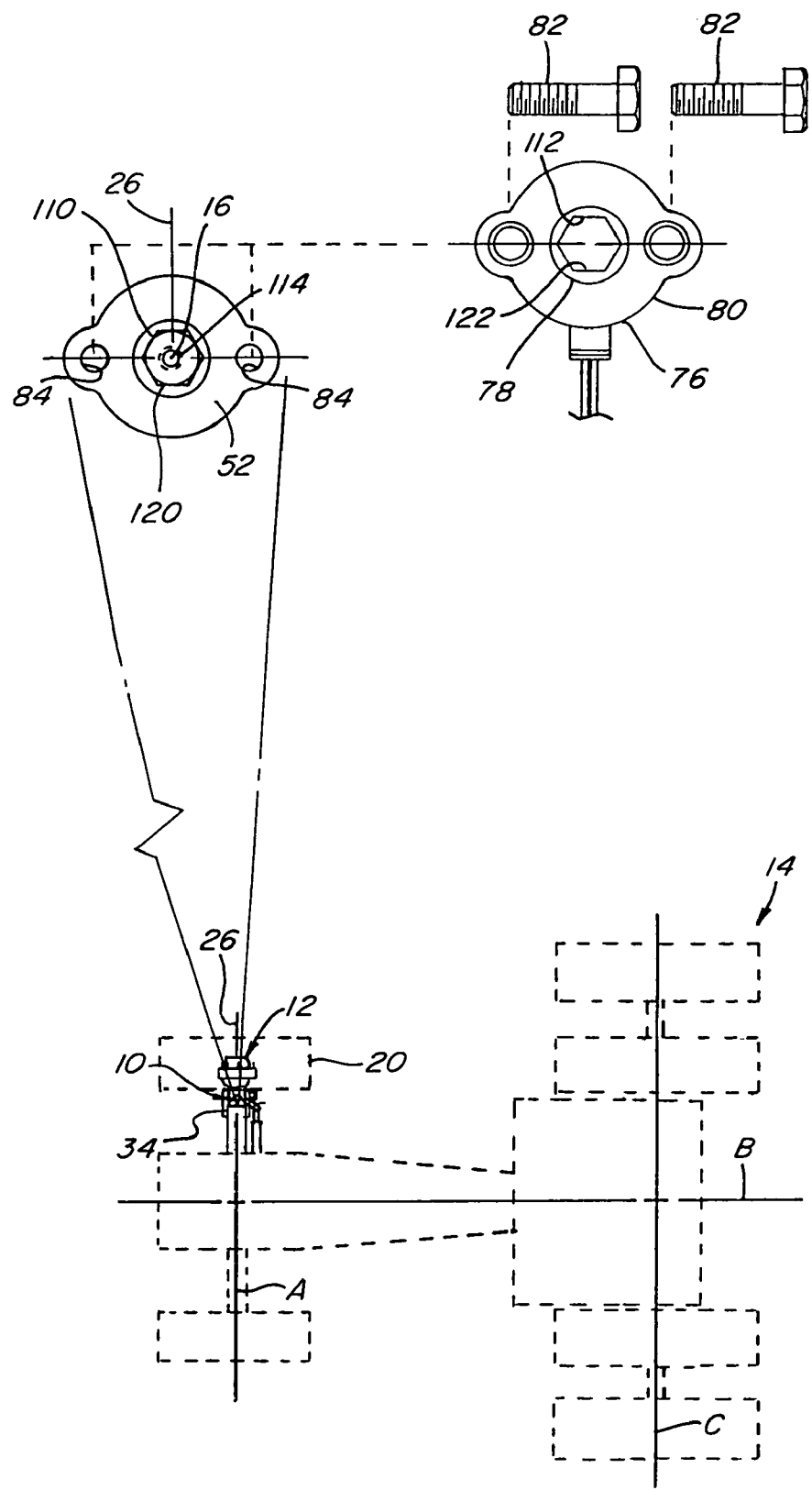
FIG. 1 is a simplified schematic top view of a tractor including an axial housing having an end supporting a steerable wheel including apparatus for sensing an angular position thereof according to the invention.

Referring now to the drawings, in FIGS. 1, 2, 3 and 4, apparatus 10 of the invention for installing a sensor for sensing angular position of a wheel hub assembly 12 of the vehicle 14 about a generally vertical steering axis 16 extending through wheel hub assembly 12, is shown. Wheel hub assembly 12 is a conventionally constructed and operable wheel hub assembly including a housing 18 to which is mountable a conventional wheel and tire assembly 20 (FIG. 1) on a mounting flange 22 using an array of lugs 24. Housing 18 and wheel and tire assembly 20 are rotatable about a generally horizontal drive axis 26 extending therethrough and through wheel hub assembly 12 in the well known manner. Wheel and tire assembly 20 and housing 18 are additionally rotatable with wheel hub assembly 12 about steering axis 16, also in the well known manner. Vehicle 14 shown is a conventionally constructed and operable tractor which is representative of a wide variety of other agricultural work machines, construction machines, mining machines, forestry machines, and the like, for which the present apparatus has utility. Here, it should be appreciated that although apparatus 10 and the method of installation according to the invention have utility for use with a wide variety of steerable wheel arrangements, including non-driven or powered wheels, apparatus 10 and the method of the invention are particularly advantageous for use with wheels of relatively heavy work machines and vehicles like vehicle 14, due to the ability to install a rotational position sensor without adjustment, so as to be capable of providing accurate, reliable sensing of angular position of the wheel hub and thus the wheel mounted thereto relative to a desired or selected reference. Apparatus 10 and the installation method of the invention also facilitate and allow removal and disassembly of apparatus 10 and also the components of wheel hub assembly 12, and reinstallation and assembly, without requiring adjustment of the sensor. Apparatus 10 and the method of the invention also have utility for installation of sensors for a wide variety of other applications involving relatively movable members and thus are not to be considered to be limited to the embodiment set forth herein.

Wheel hub assembly 12 includes a C shape support frame 28 which supports housing 18 for rotation about drive axis 26. Support frame 28 includes an upper arm 32 projecting in cantilever relation from the top of a central portion 30 and a lower arm (not shown) projecting in cantilever relation from the bottom of central portion 30, thereby defining a space 36 therebetween in which is located an axle housing end 34. Upper arm 32 has a passage 38 therethrough coaxial with steering axis 16, in which an upper kingpin 40 is fixedly mounted. The lower arm includes a similar passage therethrough which receives a lower kingpin (also not shown). Upper kingpin 40 and the lower kingpin connect wheel hub assembly 12 to axle housing end 34 for relative rotation or steering movement about steering axis 16. The steering movements of wheel hub assembly 12 and the wheel and tire assembly 20 mounted thereto about steering axis 16 are effected by longitudinal movements of a tie rod 42, connected at one end to wheel hub assembly 12 and at an opposite end to a conventional steering input device (not shown) on vehicle 14, which input device can be manually controlled, typically by a steering wheel, and/or automatically controlled by an automatic guidance system connected to apparatus 10 for receiving steering angle information therefrom.

Figure 3:
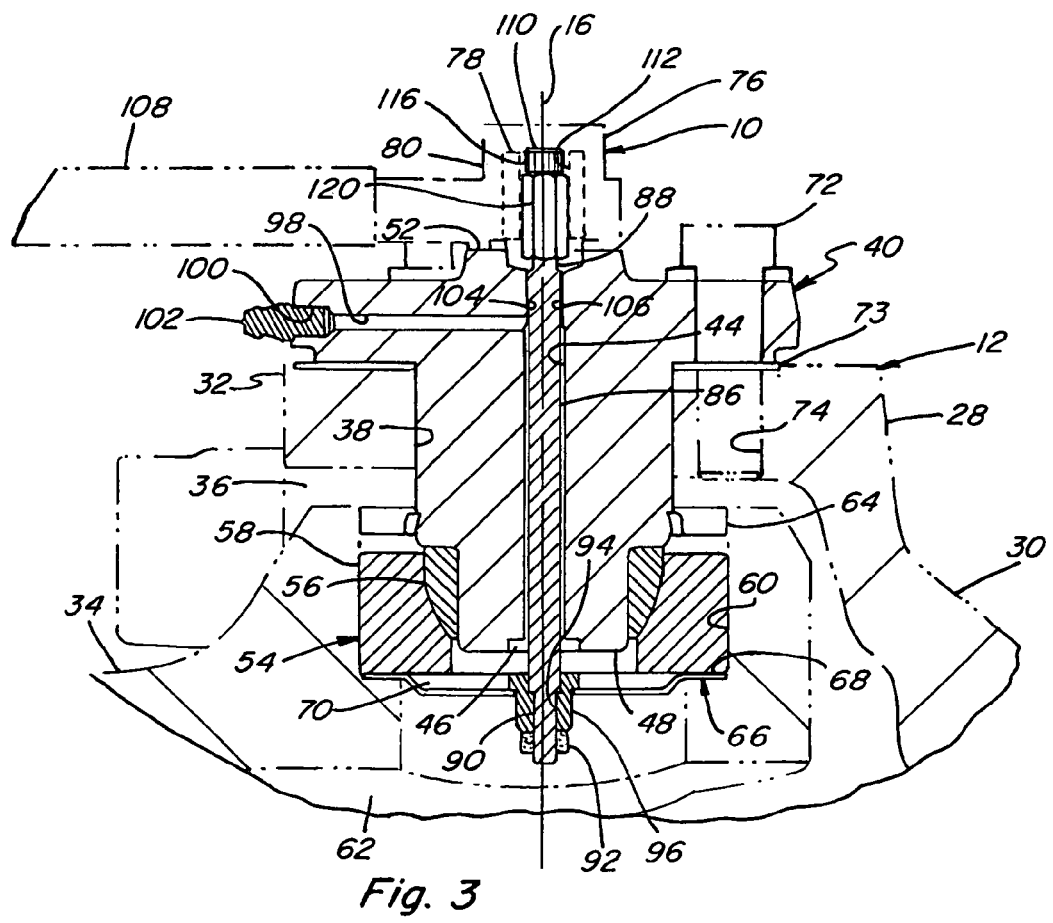
FIG. 3 is a fragmentary sectional view of the end of the axle housing and wheel hub of FIG. 2, showing the apparatus of the invention.
Figure 4:
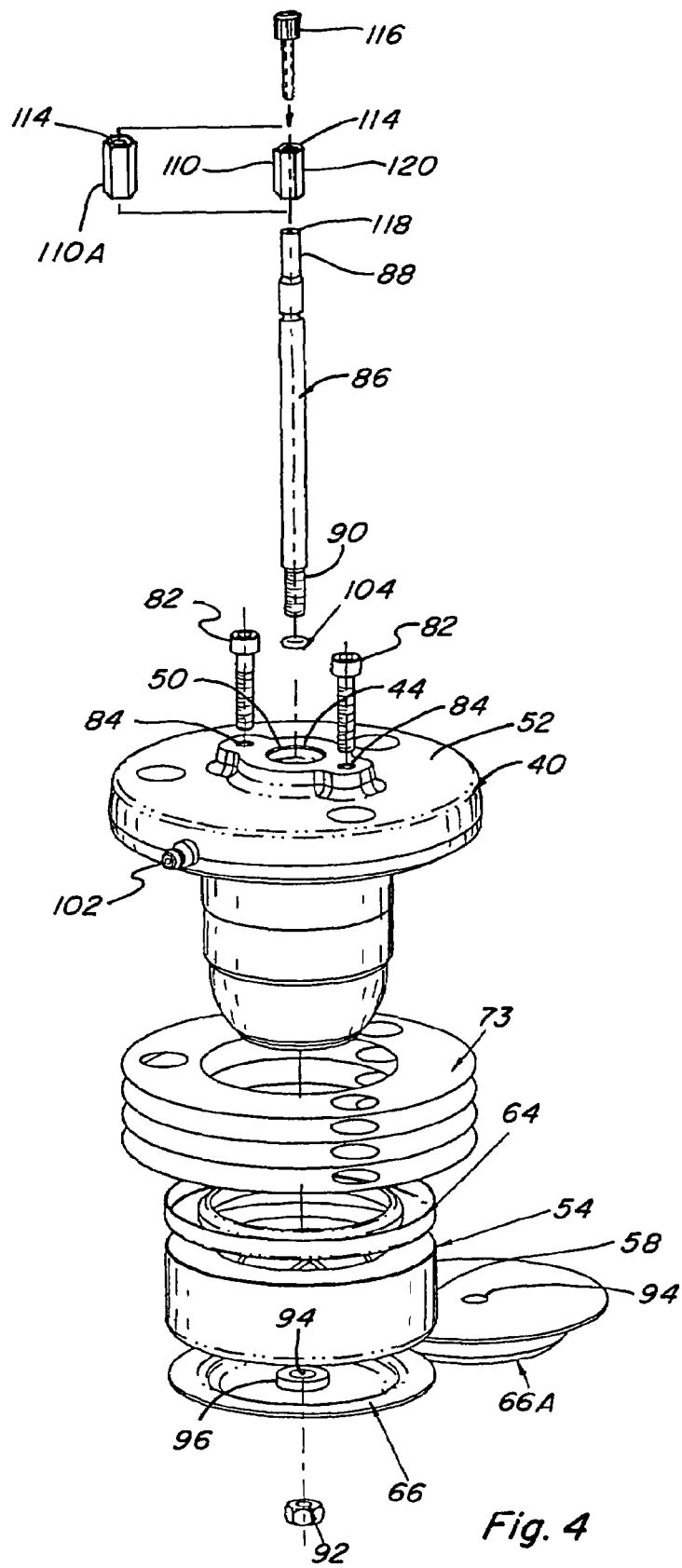
FIG. 4 is an exploded view of an upper kingpin assembly for rotatably connecting the end of the axle housing and the wheel hub of FIGS. 2 and 3, showing a pin and a coupler installable according to a method of the invention.

As best shown in FIGS. 3 and 4, upper kingpin 40 includes an axial passage 44 therethrough extending between a lower axial opening 46 on a bottom axial end portion 48 of kingpin 40, and an upper opening 50 on a top surface 52 thereof. By the usage of the term "axial" in connection with passage 44 herein, it is meant that steering axis 16 extends through passage 44, but not necessarily that passage 44 has a central axis coincident with steering axis 16.

Bottom axial end portion 48 of upper kingpin 40 is received in a bearing assembly 54 including an inner bearing ring 56 which mounts to bottom axial end portion 48 for rotation therewith relative to an outer bearing ring 58. As shown in FIG. 3, outer bearing ring 58 is receivable in an axial counter bore 60 forming a bearing seat in axle housing end 34. Beneath counter bore 60 is an open space 62 within axle housing end 34. An annular grease seal 64 is receivable in counter bore 60 to form a sealed condition around kingpin 40 above bearing assembly 54, for preventing or limiting passage of grease upwardly around the kingpin as desired.

A grease retainer 66 or 66A (FIG. 4) is positionable on and fixedly mounted to a lower shoulder 68 of axle housing end 34 around counter bore 60 beneath outer bearing ring 58, for preventing passage of grease therebelow into space 62. Retainer 66 or 66A is preferably fixedly mounted to shoulder 68 using an adhesive sealant such as commonly available under the Loctite tradename. Retainer 66 or 66A thus defines a lower periphery of a lubricant cavity 70 which has an upper periphery enclosed by seal 64 around kingpin 40. Thus, it is evident that axial passage 44 through kingpin 40 extends between top surface 52 of kingpin 40 and lubricant cavity 70.

Kingpin 40 is mounted in passage 38 of wheel hub assembly 12 in a predetermined orientation about steering axis 16 and in predetermined relation to a first reference associated with wheel hub assembly 12, such as drive axis 26 or an associated element such as a surface of flange 22 of wheel hub assembly 12 against which wheel and tire assembly 20 is or will be mounted and which establishes the direction of rotation of wheel and tire assembly 20, using a plurality of bolts 72 threadedly received in threaded holes 74 in upper arm 32 at predetermined spaced angular locations around passage 38 and steering axis 16. One or more shims 73 can be disposed between kingpin 40 and the surface of arm 32 as required for height adjustment. With bottom axial end portion 48 of kingpin 40 received in inner bearing ring 56, and inner bearing ring 56 received in outer bearing ring 58 mounted in counter bore 60 of axle housing end 34, and with a similar lower kingpin arrangement on the bottom, wheel hub assembly 12 is connected to and can support axle housing end 34, and is rotatable about steering axis 16 relative thereto in the well known manner.

A sensor 76 is provided for determining or sensing the rotational or steering position of wheel hub assembly 12 about axis 16 relative to a second reference, which is associated with vehicle 14. Sensor 76 can be, for instance, but is not limited to, a well known, commercially available Hall effect type sensor or a potentiometer, including circuitry which when powered is operable for sensing or detecting a rotational position or orientation of an input element 78 which is preferably supported for rotation in or extends into or through a body portion 80 of sensor 76. According to the invention, body portion 80 is fixedly mountable in a predetermined position on top surface 52 of kingpin 40 in a predetermined angular orientation about steering axis 16 relative to the first reference associated the wheel such as drive axis 26 or the associated element such as the outer surface of flange 22 of wheel hub assembly 12 against which wheel and tire assembly 20 is mounted. This can be accomplished in a suitable manner, such as using screws 82 threadedly receivable in threaded holes 84 located at predetermined locations in top surface 52 relative to the first reference.

Because the positions of threaded holes 74 in upper arm 32 of wheel hub assembly 12 relative to the first reference such as drive axis 26 are known, and the positions of threaded holes 84 in kingpin 40 to the first reference are known, when kingpin 40 is installed in the predetermined orientation on upper arm 32, and body portion 80 of sensor 74 is installed on kingpin 40, body portion 80 will be in a known relation to the first reference, and, when the first reference is in a particular position, for instance, a straight ahead position, body portion 80 will be in known relation to that position. As a result, when hub assembly 12 and kingpin 40 are rotated about steering axis 16 relative to axle housing end 34 from the known rotational position, body portion 80 of sensor 76 and drive axis 26 are correspondingly rotated relative thereto, and, by holding or fixing input element 78 of sensor 76 to axle housing end 34, sensor 76 would be caused to change state corresponding to the relative rotation.

Referring more particularly to FIGS. 3 and 4, apparatus 10 includes a pin 86 for connecting axle housing end 34 to input element 78 of sensor 76 through axial passage 44 of kingpin 40. Pin 86 has an upper end 88 and an opposite lower end 90. Discussing lower end 90 first, that end is fixedly mountable or connected in a suitable manner to grease retainer 66 or 66A, which is modified for that purpose, and, in turn, is fixed to lower shoulder 68 in counter bore 60 of axle housing end 34 as explained above. As a result, when wheel hub 12 is rotated about steering axis 16 relative to axle housing end 34, kingpin 40 and sensor body 80 will correspondingly rotate about pin 86. Pin 86 can be fixedly mounted or connected to retainer 66 or 66A in any suitable manner. For instance, here, retainer 66 or 66A is modified to include an axial hole 94 therethrough adapted for receiving lower end 90 of pin 86, which is threaded for threadedly receiving a nut 92. A flanged sleeve 96 is insertable from above into an axial hole in retainer 66 or 66A and includes hole 94 therethrough for receiving end 90 of pin 86. Pin 86 is thus securable to retainer 66 or 66A by threaded engagement with nut 92. An advantage of this construction is that it allows pin 86 to be installed after kingpin 40 and retainer 66 or 66A are installed, and without positioning or aligning of either retainer 66 or 66A and/or pin 86 about steering axis 16 to a reference such as drive axis 26.

Kingpin 40 additionally preferably includes a lateral passage 98 therethrough extending between an external opening 100 and axial passage 44. A cap or grease fitting 102 can be threadedly or otherwise disposed in external opening 100. This provides a path for introduction of lubricant, such as grease, into axial passage 44, through which the lubricant can flow into lubricant cavity 70, for lubricating bearing assembly 54. To contain and prevent passage of lubricant upwardly through passage 44 around pin 86, pin 86 of the invention preferably includes an O-ring groove 104 therearound, for receiving an O-ring 106 (FIG. 3), for forming a sealed condition with the inner surface of passage 44 around pin 86 when installed therein. Other means, such as a grease seal, could also be provided between pin 86 and kingpin 40 at a location above lateral passage 98, as required or desired.

Figure 2:
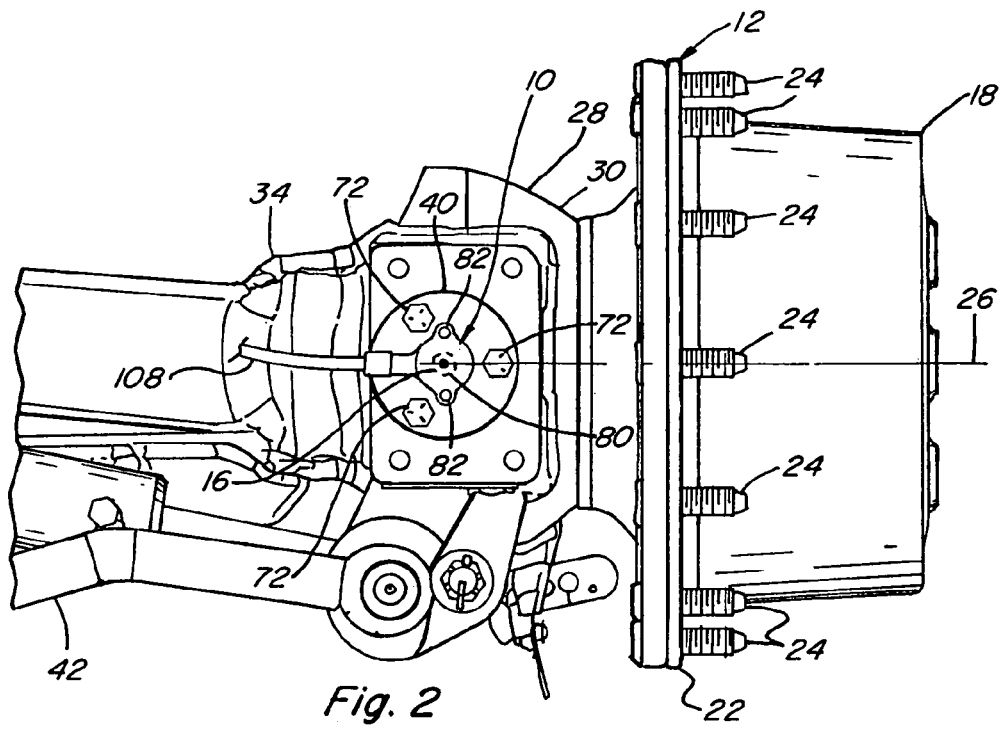
FIG. 2 is a fragmentary top view of the axle housing end and a hub of the steerable wheel, showing apparatus of the invention.

Sensor 76 is operable for outputting a signal representative of a state thereof, such as, but not limited to, a relative rotational position of input element 78 and body portion 80, over a suitable conductive path, such as a wire of a wiring harness 108 (FIGS. 2 and 3). Referring more particularly to FIG. 1, for the purposes of the present application, it is desired that this signal be representative of a rotational or steering position of wheel hub assembly 12 and wheel and tire assembly 20, represented by drive axis 26, relative to a selected second reference such as, but not limited to, a centerline of axle housing end 34, denoted by line A; a centerline of vehicle 14, denoted by line B, and/or another reference such as a centerline of rear axle of vehicle 14, denoted by line C. It is also desired that sensor 76 be installable so as to accurately output this information without requiring adjustment or repositioning.

Apparatus 10 of the invention achieves this capability by providing a coupler 110 which is mountable on upper end 88 of pin 86 in a required rotational position about axis 16 relative to the first reference associated with wheel hub assembly 12, such as drive axis 26 or the mounting surface of mounting flange 22. Coupler 110 is cooperatively engageable in a predetermined, non-relatively rotatable manner, with input element 78 of sensor 76, for connecting element 78 to axle housing end 34. Thus, with coupler 110 mounted on upper end 88 of pin 86 in predetermined relation to the first reference, element 78 in a predetermined rotational position relative to body portion 80, and body portion 80 in predetermined relation to the first reference, when powered, sensor 76 will output a signal accurately representative of the rotational or steering position of wheel hub assembly 12 relative to vehicle 14. For instance, if wheel hub assembly 12 is in a predetermined steering position, such as the straight ahead position, sensor 76 when powered will output a predetermined signal representative of that position, and different predetermined signals when wheel hub assembly 12 is rotated relative to axle housing end 34 to different steering positions.

Coupler 110 preferably has an outer surface having a predetermined shape which is cooperatively receivable in a correspondingly shape receptacle 112 of element 78 of sensor 76, for locking coupler 110 and element 78 together when the sensor is installed. Coupler 110 is preferably of tubular construction or includes an axial hole 114 therethrough (FIG. 4) for cooperatively receiving upper end 88 of pin 86. This allows coupler 110 to be placed on upper end 88 in a predetermined orientation or relationship to a selected reference, which can be, for instance, the first reference discussed above associated with wheel hub assembly 12. This can be done in any suitable convenient manner such as using a jig or tool, and/or a laser alignment device, and/or one or more lines, surfaces or marks on the components, if any. When coupler 110 is in the required position, it can be secured in place by a screw 116 insertable through hole 114 and threadedly receivable in a threaded hole 118 in upper end 88, such that coupler 110 and pin 86 will be locked together. In this regard, upper end 88 and hole 114 in coupler 110 can have outer and inner surfaces, respectively, which are optionally tapered and relatively sized such that coupler 110 will be press fit on upper end 88 as screw 116 is threaded therein and/or as body portion 80 is screwed onto surface 52 of the kingpin. Coupler 110 shown includes a hexagonal outer surface 120 which matingly engages a corresponding hexagonal inner surface 122 in receptacle 112 of element 78 of sensor 76 (FIG. 1) when received therein, for locking pin 86, coupler 110 and element 78 together when sensor 76 is installed on kingpin 40. Thus, one or more of the flat surfaces of outer surface 120 could be used for the alignment. Alternatively, coupler 110 and receptacle 112 can have other mating shapes, such as, but not limited to, shapes having one or more flat sides such as a D shape (illustrated by alternative coupler 110A in FIG. 4). As a general rule, for more precision in the alignment, coupler 110 would have a greater number of flat sides. As another alternative, it is contemplated that a receptacle 112 could be provided on coupler 110 and element 78 could include a projection receivable in receptacle 112 on coupler 110, if desired. Before or when sensor 76 is installed, element 78 will be oriented in a predetermined position in body 80 so as to be operable for outputting a signal having a predetermined value for the position corresponding to the aligning marks on element 78 and body 80, such that element 78 and body 80, and thus hub assembly 12, will be in known relation to the selected reference.

Thus, wheel hub assembly 12 can be installed in a normal manner on axle housing end 34, and sensor 76 can be simply installed without adjustment by inserting pin 86 into axial passage 44 and connecting it to retainer 66 or 66A, mounting coupler 110 in the required orientation on upper end 88 of pin 86, and then mounting body 80 of the coupler on kingpin 40 with element 78 in a predetermined position in body 80 and matingly connected to coupler 110. As an example, referring again to FIG. 1, wheel hub assembly 12 can be positioned such that drive axis 26 is aligned or parallel with the centerline A of axle housing end 34, or in some other known relation thereto. Coupler 110 can be positioned such that a flat side of hexagonal outer surface 120 is in predetermined relation to axis 26, such as perpendicular thereto, as shown. Screw 116 (FIGS. 3 and 4) can then be inserted in and threadedly engaged with threaded hole 114 in upper end 88 of pin 86, for holding coupler 110 in position. Sensor 76, with input element 78 oriented in predetermined relation to body 80 as shown, can then be installed on top surface 52 of kingpin 40 using screws 82 threadedly engageable in holes 84, such that coupler 110 is matingly received in receptacle 112 of element 78 to lock element 78, coupler 110 and pin 86 together with retainer 66 or 66A (FIG. 3). As a result, rotation of kingpin 40 with wheel hub assembly 12 will correspondingly rotate body 80 of sensor 76 relative to element 78, such that sensor 76 will output a signal representative of the rotation. Subsequently, if removal of sensor 76 and/or wheel hub assembly 12 from axle housing end 34 is required, reinstallation or replacement of sensor 76 is accomplished in the same manner.

Figure 5:
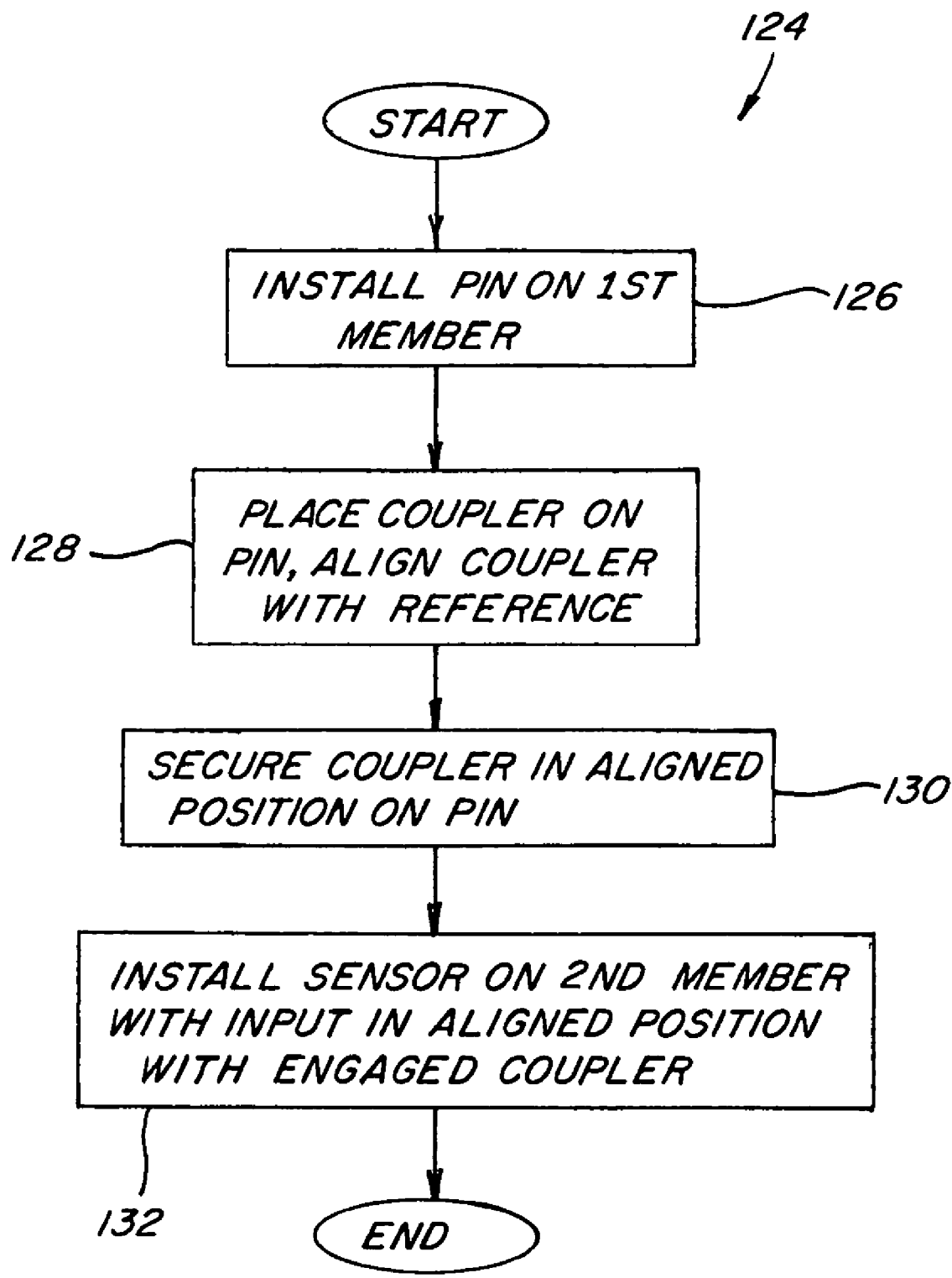
FIG. 5 is a high level flow diagram showing steps of a method of the invention.

Referring also to FIG. 5, a flow diagram 124 showing steps of installing a sensor such as, but not limited to, sensor 76, without adjustment according to the present invention, is shown. Prior to the installation, wheel hub assembly 12 is installed on axle housing end 34 in the normal manner, such that retainer 66 or 66A is in position on shoulder 68 and kingpin 40 is mounted on wheel hub assembly 12, all as explained above. As a first step, as denoted by block 126, pin 86 is installed on retainer 66 or 66A, in connection with axle housing end 34, by insertion into and through passage 44 of kingpin 40, through hole 94 of retainer 66 or 66A, and threaded engagement with nut 92. As denoted at block 128, coupler 110 is placed on upper end 88 of pin 86 and aligned with a reference, such as, but not limited to, mounting flange 22 of hub assembly 12, by aligning a flat surface portion of outer surface 120 with flange 22. Coupler 110 is then secured in the aligned position on end 88 with screw 116, as denoted by block 130. Sensor 76, with element 78 in predetermined position in body 80, can then be installed on surface 52 of kingpin 40 with screws 82, as denoted by block 132.

Here, it should be noted that the apparatus and method of the invention are adapted for use in a wide variety of other applications in addition to that set forth above. For instance, the apparatus and method of the invention are adapted for use in installing a sensor such as sensor 76 on a lower kingpin of the construction set forth herein in the same manner as set forth above. The apparatus and method of the invention are also adapted for constructions wherein the kingpin is fixedly mountable on the axle end and the wheel hub is rotatable relative thereto, such that pin 86, coupler 110 and element 78 will rotate relative to body 80 of the sensor.

Figure 6:
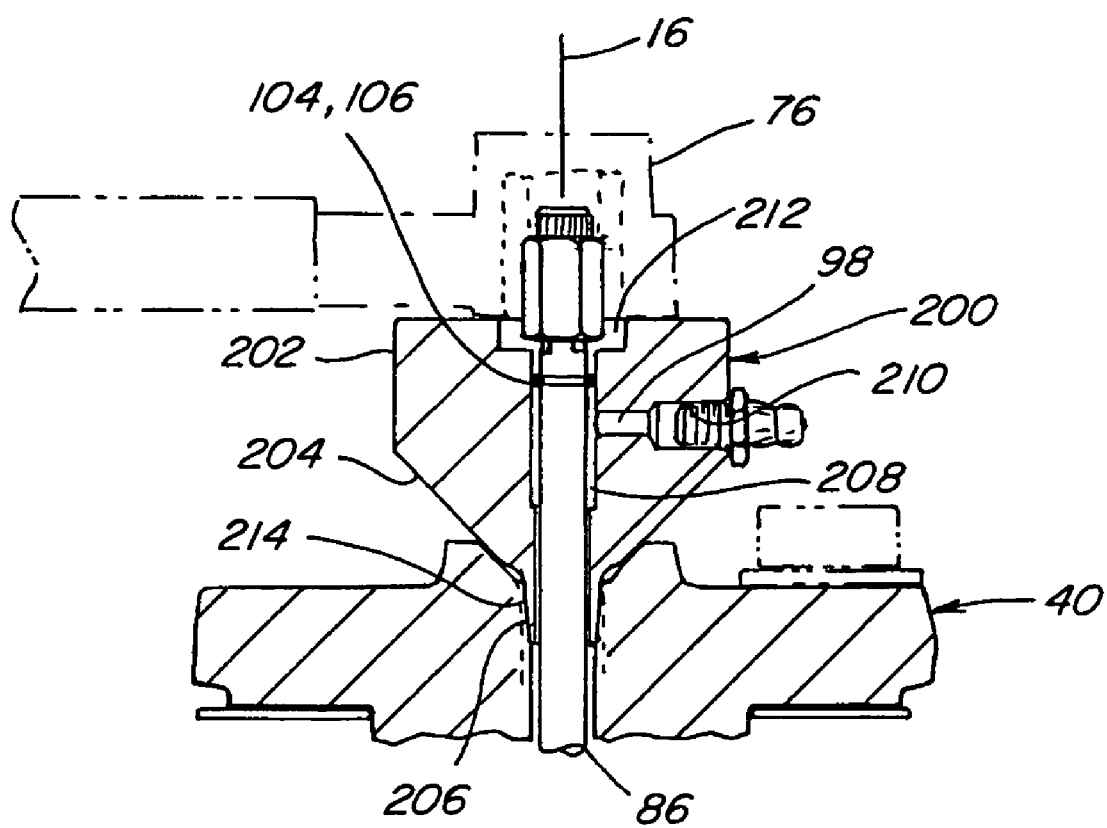
FIG. 6 is a fragmentary sectional view of the end of the axle housing and wheel hub of FIG. 2, showing an alternative embodiment of the apparatus of the invention.
Figure 8:
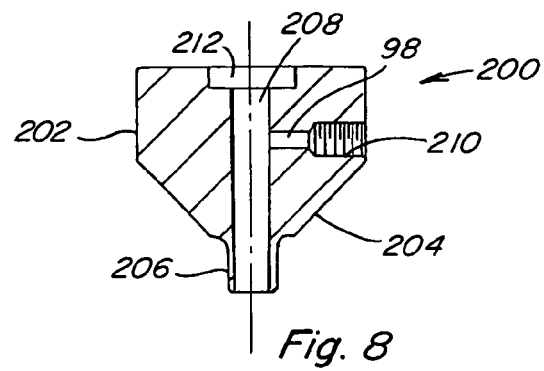
FIG. 8 is a side sectional view of a sensor mount of the apparatus of FIG. 6, taken along line 8-8 of FIG. 10.
Figure 10:
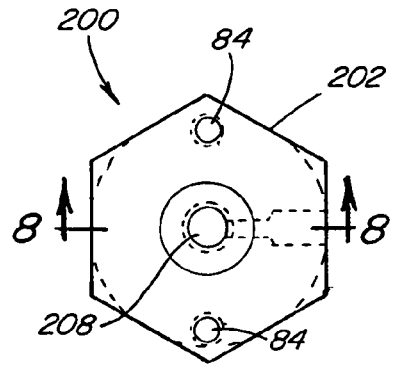
FIG. 10 is a top view of a sensor mount.
Figure 9:
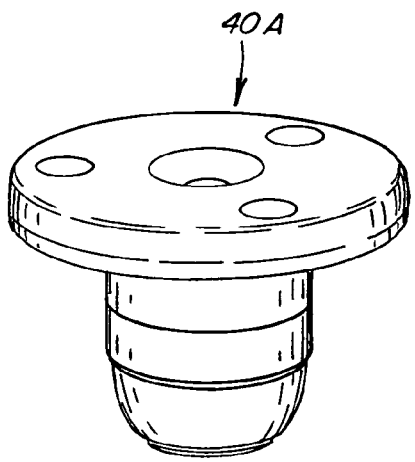
FIG. 9 is a perspective view of a standard kingpin.
Figure 7:
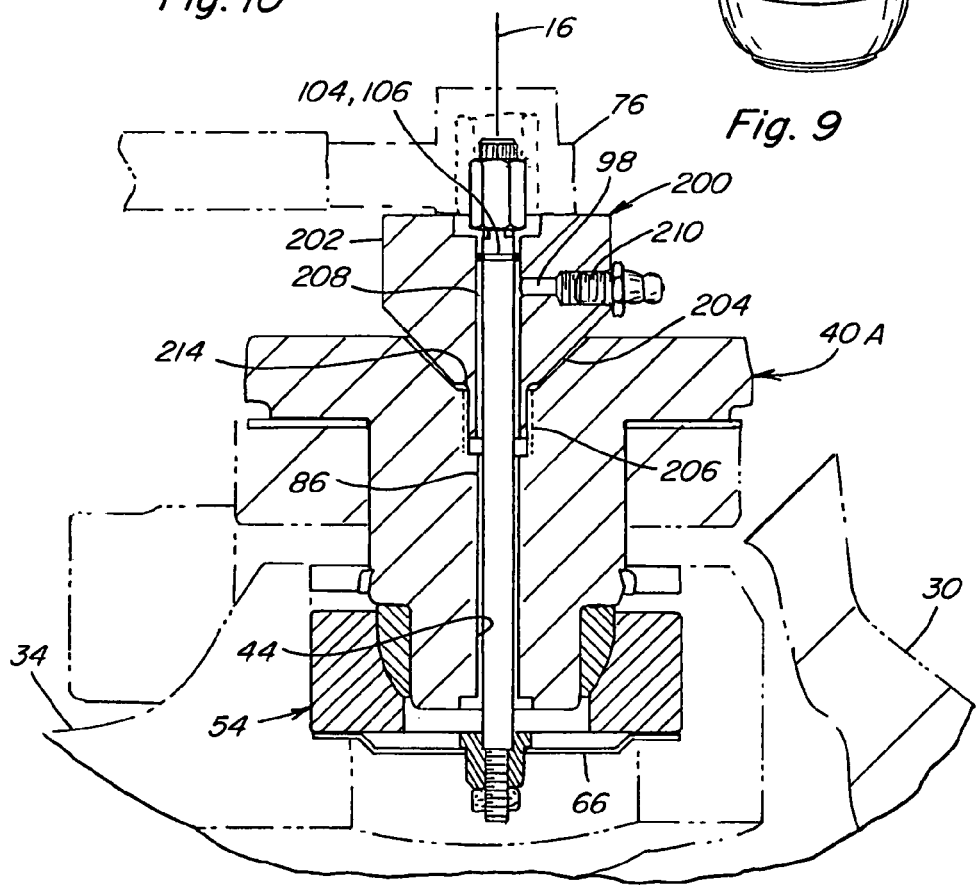
FIG. 7 is a fragmentary sectional view of the upper kingpin, showing another alternative apparatus of the invention.

Referring also to FIGS. 6 through 10, in another preferred embodiment, a sensor such as sensor 76 can be mounted on a kingpin, such as kinpin 40 in essentially the above described manner using a separate sensor mount 200 of the invention, as best shown in FIG. 6. Or, rather than using a kingpin 40 which may have to be modified to include a pair of threaded or tapped holes 84 and a mounting surface for a sensor in top surface 52 of the kingpin 40 (as shown in FIG. 4), a more standard kingpin 40A can be used, and a mount 200 provided as a separate member, as shown in FIG. 7, also for installation in essentially the above described manner. Thus, a standard kingpin 40A can be used and the mount 200 can be inserted if necessary to support a sensor such as sensor 76. In a standard kingpin, such as kingpin 40A, no threaded or tapped holes 84 or raised mounting surface is provided. Rather, as shown in FIG. 9, a standard kingpin 40A has a recess formed in its top surface at the center thereof. A female threaded hole 214 is normally formed in the top surface approximately near the center of the recess. The threaded hole 214 is conventionally located such that a steering axis of the steering assembly with which the kingpin is used, will extend therethrough. Threaded hole 214 is configured for receiving a grease fitting, commonly called a ZERK, and the threads are typically tapered or pipe threads, such that the ZERK becomes tightened and fixed in position on the kingpin when the threads are engaged.

The mount 200 includes a hexagonal shaped top 202 for receiving a standard wrench, a tapered middle 204 and a threaded nipple 206, preferably a male pipe thread, having threads which mate with the threads of hole 214 just discussed. Top 202 will preferably include threaded holes 84 therein, on opposite sides of a passage or shaft 208 through mount 200, for mounting a sensor such as sensor 76 thereon, adjacent to an opening 212 in connection with shaft 208, in the above described manner. Alternatively, the sensor can be mounted in another manner, such as using adhesives or other fasteners. The threaded nipple 206 of mount 200 fits into and is threadedly engaged with the threaded hole 214 in the top surface of a kingpin 40, or a standard kingpin 40A, in place of the normal grease fitting, so as to form a continuation or extension of an axial passage 44 through the kingpin. Mount 200 can be tightened so as to be fixedly mounted on a kingpin in this manner, such as by using a suitable wrench, to seal the connection between passage 44 and shaft 208, and to orient threaded holes 84 for installation of a sensor thereon in a predetermined orientation about the kingpin, as described above. Passage or shaft 208 extends completely through the mount 200 and a threaded hole 210 is formed in the side of the mount 200 in connection with a second or lateral passage 98 which connects with shaft 208. Shaft 208 is sized to accommodate an element such as a pin 86 for rotation therein, again, in the above described manner. The threaded hole 210 is sized so as to receive a grease fitting for introduction of grease into passage 98 and shaft 208, so as to flow into axial passage 44 through the kingpin for lubricating a bearing assembly 54 in the above described manner.

A pin 86 will be provided and installed in the manner described above, except that it will have a greater length to accommodate the length of mount 200 and kingpin 40 or 40A. Pin 86 will be connected to another member relatively rotatable with the kingpin by virtue of a bearing assembly 54 therebetween, such as a grease retainer 66 in connection with a central portion 30 of an axle housing end 34, as explained more fully above. Pin 86 installed in shaft 208 preferably should have an O-ring groove 104 therearound disposed so as to be located between passage 98 and opening 212, to prevent lubricant, such as grease introduced through passage 98, from reaching and disturbing sensor 76.

By virtue of the form of the mount 200, a standard kingpin can be used with a rotational position sensor, such as a sensor 76, and kingpin assemblies that are adapted to be used without rotation sensors can be rapidly converted to kingpin assemblies that are adapted to be used with rotation sensors.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiments of the invention; however, concepts, as based upon the description, may be employed in other embodiments without departing from the scope of the invention. Accordingly, the following claims are intended to protect the invention broadly as well as in the specific form shown.

What is claimed is:

1. Apparatus for mounting a sensor on a kingpin, comprising:
    a mount having a passage therethrough extending between opposite end portions thereof, one of the end portions including a threaded portion configured for threadedly mounting on one end of a kingpin in alignment with a passage therethrough such that the passage through the mount will serve as an extension of the passage through the kingpin end such that a steering axis of a wheel hub extending through the passage through the kingpin will extend through the passage through the mount,
    and the other of the end portions of the mount being configured for mounting a sensor thereon such that an input of the sensor will be located in a position for sensing a rotational position of an element extending through and rotatable within the passage through the kingpin;
    the threaded portion of said one of the end portions of the mount comprises a male tapered threaded portion; and
    the other of the end portions of the mount includes threaded holes at predetermined locations on opposite sides of the passage through the mount, for receiving threaded fasteners for mounting the sensor in a predetermined orientation thereon, and the mount is threadedly mountable on the kingpin at a predetermined rotational position.

2. The apparatus of claim 1, wherein the mount is threadedly mountable on the kingpin at the predetermined rotational position about the passage therethrough, such that the sensor mounted on the mount will be oriented at a predetermined rotational position about the passage through the kingpin on which the mount is mounted.

3. The apparatus of claim 1, wherein the mount includes a second passage therein in connection with the passage therethrough, and an opening in connection with the second passage configured for receiving a grease fitting therein.

4. The apparatus of claim 3, further comprising a grease fitting mounted in the opening of the mount in connection with the second passage.

5. The apparatus of claim 3, further comprising a pin configured so as to be positionable and rotatable in the passage through the mount, the pin having a length which is sufficient so as to extend beyond the passage through the mount so as to be capable of extending through the passage through the kingpin on which the mount is mounted and so as to extend into the sensor mounted on the mount, the pin including an end configured so as to be fixedly connectable to a member with which the kingpin is relatively rotatable.

6. The apparatus of claim 5, wherein the pin includes a groove therearound disposed so as to be located between the other of the end portions of the mount and the lateral passage, the groove being configured for receiving an O-ring therein for forming a sealed condition between the pin and an internal surface of the mount defining the passage therethrough.

7. The apparatus of claim 5, wherein an other end of the pin includes a coupler rotatable about the pin and fixable thereon at a selected rotational position about an axis extending therethrough, the coupler being cooperatively engageable with the input of the sensor when in a predetermined rotational position, such that the input of the sensor and a body of the sensor can be oriented in predetermined rotational positions in relation to the kingpin and the member with which the kingpin is relatively rotatable, and such that the input of the sensor and the body will be relatively rotated by relative rotational movements of the member and the kingpin.

8. The apparatus of claim 1, wherein the mount has a hexagonal shaped outer surface.

9. Apparatus for mounting a sensor on a kingpin, comprising:
a mount having a passage therethrough extending between opposite end portions thereof, one of the end portions including a threaded portion configured for threadedly mounting on one end of a kingpin in alignment with a passage therethrough such that the passage through the mount will serve as an extension of the passage through the kingpin and such that a steering axis of a wheel hub extending through the passage through the kingpin will extend through the passage through the mount,
and the other of the end portions of the mount being configured for mounting a sensor thereon such that an input of the sensor will be located in a position for sensing a rotational position of an element extending through and rotatable within the passage through the kingpin; and
wherein the threaded portion of said one of the end portions of the mount comprises a male threaded portion located on a nipple extending from the mount and threadedly engageable with a female threaded portion within an opening in connection with the passage through the kingpin.

10. Apparatus for mounting a rotational position sensor on a kingpin, comprising:
a mount having opposite first and second end portions, and a passage extending through the body between the end portions, the first end portion being configured for fixedly mounting the mount on an end portion of the kingpin such that the passage extending through the mount will form an extension of an axial passage extending through the kingpin, the second end portion being configured for fixedly mounting a body of a rotational position sensor thereon such that a rotatable input of the sensor will be positioned for connection to a pin extending through the passage through the mount; and
the pin configured to extend through the passage through the mount and the passage through the kingpin on which the mount is mounted so as to be rotatable therein, the pin having an end portion configured for connection to the input of the sensor mounted on the second end portion of the mount for joint rotation relative to the body of the sensor, and an opposite end portion configured for connection to a member with which the kingpin on which the mount is mounted is relatively rotatable, such that relative rotation of the member and the kingpin will cause relative rotation of the input and the body of the sensor; and
wherein the end portion of the pin configured for connection to the input of a sensor comprises a coupler rotatable about the pin and fixable at a selected rotational position thereon.

11. The apparatus of claim 10, wherein the mount further comprises a second passage extending from the passage through the mount to an opening on an external surface of the mount configured for receiving a grease fitting therein and through which grease can be introduced into the passage through the mount.

12. The apparatus of claim 11, wherein the pin includes a groove therearound disposed so as to be located between the second end portion of the mount and the second passage, the groove being configured for receiving an O-ring therein for forming a sealed condition between the pin and an internal surface of the mount defining the passage therethrough, for limiting movement of grease introduced into the passage toward the second end portion of the mount.

13. The apparatus of claim 10, wherein the second end portion of the mount includes threaded holes at predetermined locations on opposite sides of the passage through the mount, for receiving threaded fasteners for mounting the rotational position sensor in a predetermined orientation thereon, and the mount is threadedly mountable on the kingpin at a predetermined rotational position about the passage therethrough, such that the rotational position sensor mounted on the mount will be oriented at a predetermined rotational position about the passage through the kingpin on which the mount is mounted.

14. The apparatus of claim 13, wherein the end portion of the pin configured for connection to the input of the sensor comprises a coupler positionable on the pin for rotation thereabout and fixedly mountable in a desired rotational position thereon.

15. The apparatus of claim 14, wherein the coupler is fixedly mountable in the desired rotational position on the pin by a fastener.

16. The apparatus of claim 14, wherein the coupler is fixedly mountable in the desired rotational position on the pin by a press fit.

17. The apparatus of claim 10, wherein the first end portion of the mount comprises a male threaded portion located on a nipple extending from the mount.

18. The apparatus of claim 10, wherein the mount has a hexagonal shaped outer surface.

19. Apparatus for mounting a rotational position sensor on a kingping, comprising:
a mount having opposite first and second end portions, and a passage extending through the body between the end portions, the first end portion being configured for fixedly mounting the mount on an end portion of the kingpin such that the passage extending through the mount will form an extension of an axial passage extending through the kingpin, the second end portion being configured for fixedly mounting a body of a rotational position sensor thereon such that a rotatable input of the sensor will be positioned for connection to a pin extending through the passage through the mount; and
the pin configured to extend through the passage through the mount and the passage through the kingpin on which the mount is mounted so as to be rotatable therein, the pin having an end portion configured for connection to the input of the sensor mounted on the second end portion of the mount for joint rotation relative to the body of the sensor, and an opposite end portion configured for connection to a member with which the kingpin on which the mount is mounted is relatively rotatable, such that relative rotation of the member and the kingpin will cause relative rotation of the input and the body of the sensor; and wherein the member with which the kingpin is relatively rotatable comprises a grease retainer, and the opposite end portion of the pin configured for connection to the member comprises a threaded end portion.

* * * * *